(12) United States Patent
Seul et al.

(10) Patent No.: US 10,212,175 B2
(45) Date of Patent: Feb. 19, 2019

(54) ATTRACTING AND ANALYZING SPAM POSTINGS

(71) Applicant: International Business Machines Corporation, Armonk, NY (US)

(72) Inventors: Matthias Seul, Kassel (DE); Volker Vogeley, Bad Sooden-Allendorf (DE)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 14/953,798

(22) Filed: Nov. 30, 2015

(65) Prior Publication Data
US 2017/0155666 A1   Jun. 1, 2017

(51) Int. Cl.
*H04L 29/06* (2006.01)
*H04L 29/08* (2006.01)

(52) U.S. Cl.
CPC ...... *H04L 63/1416* (2013.01); *H04L 63/0236* (2013.01); *H04L 63/1491* (2013.01); *H04L 67/02* (2013.01); *H04L 2463/146* (2013.01)

(58) Field of Classification Search
CPC .. H04L 63/1416; H04L 63/0236; H04L 67/02
USPC .......................................................... 726/23
See application file for complete search history.

(56) References Cited

U.S. PATENT DOCUMENTS

| | | | |
|---|---|---|---|
| 6,332,163 B1 * | 12/2001 | Bowman-Amuah | H04L 12/4604 709/217 |
| 7,752,251 B1 * | 7/2010 | Shuster | G06F 15/16 709/200 |
| 2006/0168202 A1 * | 7/2006 | Reshef | G06Q 10/107 709/224 |
| 2008/0301281 A1 * | 12/2008 | Wang | G06F 21/56 709/224 |
| 2009/0064330 A1 * | 3/2009 | Shraim | H04L 51/12 726/22 |
| 2009/0248806 A1 * | 10/2009 | Teman | G06Q 30/02 709/206 |
| 2010/0186088 A1 * | 7/2010 | Banerjee | G06F 21/51 726/23 |
| 2011/0047117 A1 | 2/2011 | Sinha | |
| 2013/0124644 A1 | 5/2013 | Hunt et al. | |

(Continued)

FOREIGN PATENT DOCUMENTS

| | | | | |
|---|---|---|---|---|
| WO | WO 2006060284 A2 * | 6/2006 | | H04L 12/585 |
| WO | WO-2006119480 A2 * | 11/2006 | | G06F 21/50 |
| WO | 2015007231 A1 | 1/2015 | | |

OTHER PUBLICATIONS

Itoh et al., Investigation and Analysis of Malware on Websites, NTT Information Sharing Platform Laboratories, Mar. 10, 2010, IEEE, pp. 73-81.*

*Primary Examiner* — Harunur Rashid
*Assistant Examiner* — Sakinah White Taylor
(74) *Attorney, Agent, or Firm* — Alexis N. Hatzis

(57) ABSTRACT

One or more processors generate a website mimicking a virtual message board. One or more processors receive a request message directed to the website. One or more processors analyze the request message for evidence that the request message originates from a source of spam. In response to a determination that the request message likely does originate from a spam source, one or more processors provide data about the spam source to an anti-spam system.

15 Claims, 9 Drawing Sheets

(56) References Cited

U.S. PATENT DOCUMENTS

| | | | |
|---|---|---|---|
| 2014/0041023 A1* | 2/2014 | Lekies | G06F 21/51 |
| | | | 726/22 |
| 2014/0101249 A1* | 4/2014 | Lampe | H04L 65/403 |
| | | | 709/204 |
| 2014/0189864 A1* | 7/2014 | Wang | G06F 21/51 |
| | | | 726/23 |
| 2015/0052138 A1 | 2/2015 | Sutton et al. | |
| 2015/0237061 A1* | 8/2015 | Shraim | H04L 63/1425 |
| | | | 726/22 |
| 2016/0381023 A1* | 12/2016 | Dulce | H04L 63/10 |
| | | | 726/9 |
| 2017/0093917 A1* | 3/2017 | Chandra | H04L 63/20 |

\* cited by examiner

ATTRACTING AND ANALYZING SPAM POSTINGS

BACKGROUND OF THE INVENTION

The present invention relates to the field of data processing and more particularly to the field of spam protection.

When spammers want to promote links they are using or intend to use for advertising and selling goods or services, they often look for ways to get their search engine ranking increased. The process of promoting and cross-linking pages to get a better search engine ranking for a given search term, also known as search engine marketing (SEM), often results in the misuse of web-based virtual message boards provided by websites of social communities or websites. Misuse often occurs by using comment features to plant many kinds of links in order to be found and processed by search engine crawlers.

These links benefit from the reputation of the website being used. Furthermore, spammers often use forum posts as a link in spam emails. That way, spammers may post a link to a legitimate website of a social community with a lowered risk of detection by anti-spam software because the link benefits from the good reputation of the social community host.

Traditional anti-spam posting approaches involve "crawling" forum posts to gather links posted by spammers. However, this approach may require an extensive amount of time to identify spammer links due to the enormous amount of data that typically needs to be searched. Even when spammer links are detected, deep crawling may be required to confirm that the links are actually linked to a fraudulent target. If spammer links have not been identified as spammer links, then whenever these links are found by a user, even by a customer of spam protection software, the user is unprotected since the links appear to be of good reputation at first sight.

SUMMARY

Embodiments of the present invention provide a method, system, and program product to attract and analyze spam postings. One or more processors generate a website mimicking a virtual message board. One or more processors receive a request message directed to the website. One or more processors analyze the request message for evidence that the request message originates from a source of spam. In response to a determination that the request message likely does originate from a spam source, one or more processors provide data about the spam source to an anti-spam system.

DETAILED DESCRIPTION

Figure 1:
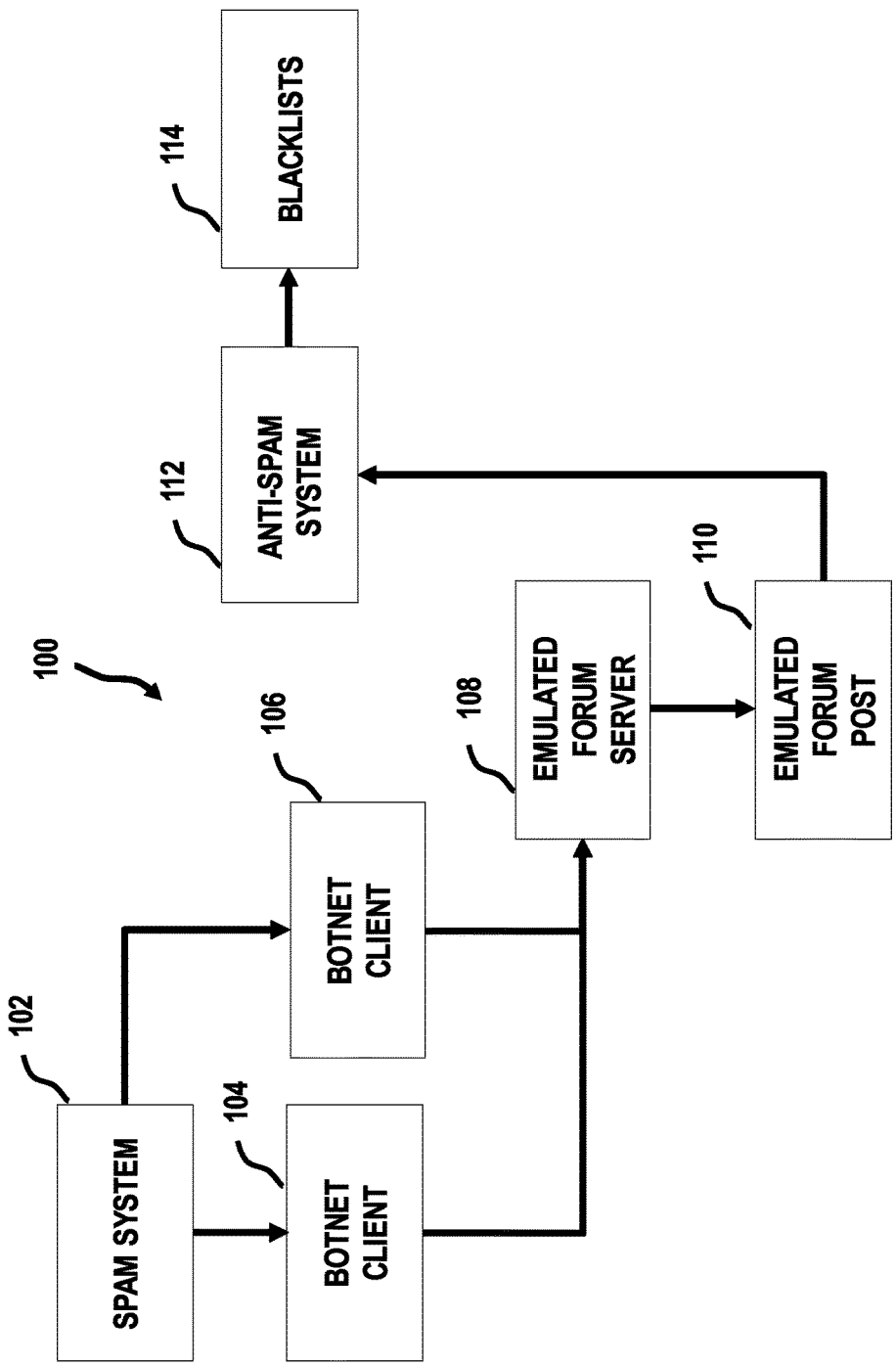
FIG. 1 depicts a first schematic block diagram illustrating a network including a emulated forum server for attracting and analyzing spam postings, in accordance with an exemplary embodiment of the present invention.

The present invention includes the following example features:

Various embodiments of the present invention provide a virtual "honey pot" system in the form of at least one website mimicking a virtual message board able to handle incoming online posts for automated capturing and processing. According to some of these embodiments, the above is achieved by automatically creating one or more websites mimicking virtual message boards, publishing the respective websites online, reacting to request messages attracted from botnet clients, and processing spam posts in order to obtain observables such as IP addresses of the botnet clients, URLs included by the posts, etc.

Various embodiments of the present invention provide improvements in terms of performance and detection time over existing spam capture and/or URL crawling methods. While other approaches rely on active detection of already present postings by crawling the Internet or passive reporting by automated customer feedbacks, embodiments of the present invention lure in potential spammers to deliver their payload. Instead of being reliant on finding spam-related postings in time, i.e. before they are accessed by an Internet user, embodiments of the present invention capture the respective postings at the very source. Based on the information gained (e.g. about source addresses of spam postings or spam-related URLs), spam protection is provided against the respective postings before they are accessed by an Internet user. Thus, embodiments of the present invention allow for a pre-emptive attracting and analyzing of spam postings.

Some existing crawler methods require content to be detected which, given the size and complexity of the Internet can take hours or days to occur or may even not happen at all, since crawlers need to be able to locate content. Passive reporting requires at least one customer of anti-spam protection software encountering the spam link and thus being potentially exposed to malicious contents before a suitable protection has been established.

Embodiments of the present invention recognize attracting potentially new and unknown, malicious content. Embodiments create a dynamic "trap" or "decoy", also referred to as a "honey pot" that encourages spam attackers to publish their content using that decoy. In some embodiments, any content posted using such a decoy is treated as spam-related and/or potentially harmful. In some embodiments and scenarios, such posted content is used to enhance known spam protection technologies.

Embodiments of the present invention provide attackers with a decoy that automatic spamming tools like botnet clients are not be able to detect the deception. In some scenarios this increases the probability that attackers will treat the decoy websites as a viable point for deploying their content. In some embodiments and scenarios, since certain data posted by the attackers is retained, the embodiments are configured to allow the passing of quality checks by the attackers in order to increases the probability that the decoy appears to be real, i.e., it appears to be an actual virtual message board and not a simulation of one, to a potential sender of spam.

Some embodiments are configured to attract spam-related postings directly from their sources, e.g. botnet clients, and captured data is immediately processed to provide protection updates. In some scenarios, such an approach reduces the time necessary to produce the respective updates. Further, since the posted content is captured and safely disposed of, the odds that the respective spam content has not been used by spammers are increased since the links to the respective posts were rendered inoperable shortly after posting. Furthermore, some embodiments are configured to automatically emulate a large number of honey pot websites with minimal resources required, thus reducing CPU resources, memory and bandwidth required when compared to other approaches to mimicking a virtual message board able to handle incoming online posts for automated capturing and processing.

According to various embodiments of the present invention, the embodiments are configured to add the respective payload as a posting to a posting display webpage of the respective first website and sending the posting display webpage as the respective confirmation message to the source address of a first request message. In some embodiments and scenarios, this has the beneficial effect that an automated spam computer device like a botnet client determines, based on the provided posting display webpage, that the posting request has been successful.

According to various embodiments of the present invention, the selection of the first set of pre-fabricated template elements from the set of pre-fabricated templates further includes: selecting a topic and a language for the first website from a set of topics and languages, and using the selected topic and language as a selection criterion for the selection of the first set of pre-fabricated template elements. In some embodiments and scenarios, this has the beneficial effect that websites for a large variety of topics and languages are automatically generated, which in some scenarios increases the number and variety of spam-related request messages that are attracted.

According to some embodiments of the present invention, the topic and the language for the first website is selected randomly. According to other embodiments of the present invention, the topic and the language for the first website are selected according to a repeating pattern.

According to embodiments of the present invention, selection of the topic and the language for the first website takes into account a relative weighting of the topics and languages of the set of topics and languages. In some embodiments and scenarios, this has the beneficial effect that certain topics and languages that are preferred by spammer websites are more likely to be generated than topics and languages that are less popular with such spammer websites.

According to embodiments of the present invention, the selection of the domain name used for generating the first URL further includes using the selected topic and language as a selection criterion for the selection of the respective domain name and using the selected topic and language for generating the first URL. In some embodiments and scenarios, this has the beneficial effect that, based on the respective URL published on the network, spam computer devices are more likely to send spam-related request messages to the decoy.

According to embodiments of the present invention, the embodiments are configured to advertise the first website mimicking a virtual message board via the Internet. In some embodiments and scenarios, this has the beneficial effect that a large number of spammers are more likely to send spam-related request messages to the decoy.

According to embodiments of the present invention, adding the payload of the first request message as a posting to the posting display webpage further includes sanitizing the respective payload from URLs and malware related elements. In some embodiments and scenarios, this has the beneficial effect that spam-related content included in the payload is inhibited from being spread via the website that is mimicking a virtual message board.

According to embodiments of the present invention, the embodiments are configured to delete the added payload from the posting display webpage of the respective website. In some embodiments and scenarios, this has the beneficial effect that the respective payload is inhibited from being spread via the posting display webpage.

According to embodiments of the present invention, the respective payload is deleted from the posting display webpage of the first website upon sending the respective posting display webpage to the source address of the first request message. In some embodiments and scenarios, this has the beneficial effect that the respective posting display webpage is inhibited from being provided to clients other than the requesting botnet client.

According to embodiments of the present invention, the respective payload is deleted from the posting display webpage of the first website after a pre-defined interval of time.

According to embodiments of the present invention, the embodiments are configured to delete the generated first website mimicking a virtual message board. In some embodiments and scenarios, this has the beneficial effect that new websites are repeatedly offered for attracting new spam postings.

According to embodiments of the present invention, the first website mimicking a virtual message board is deleted in response to receiving no request message directed to the respective website for a pre-defined period of time. In some embodiments and scenarios, this has the beneficial effect that websites that are not of interest to spammers are replaced by new ones.

According to embodiments of the present invention, the processing of the extracted source address and the extracted one or more URLs further includes sending the respective source address and URLs to an anti-spam system, which is configured to generate updates of source address and URL blacklists for an anti-spam protection software. In some embodiments and scenarios, this has the beneficial effect that updated blacklists are provided to users of the respective anti-spam protection software thereby providing a high level of up-to-date spam protection.

According to embodiments of the present invention, the embodiments are configured to receive a second request message directed to the first URL of the first website requesting a posting webpage of the first website, extracting the source address of the second request message, sending the posting webpage to the source address of the second request message in response to receiving the second request message, and receiving the first request message in response to sending the posting webpage. In some embodiments and scenarios, this has the beneficial effect that posting infrastructure of a common message board (as expected by the spam computer device) is provided.

According to embodiments of the present invention, the embodiments are configured to assign the posting with a unique identifier, receiving a third request message directed to the first URL of the first website, and analyzing the third request message, which further includes: extracting the source address of the third request message, determining whether the third request message requests to receive a posting display webpage of the first website, which further includes the respective posting by providing the respective unique identifier, and sending a requested posting display webpage to the source address of the third request message in response to determining that the third request message requests to receive the posting display webpage of the first website including the respective posting by providing the respective unique identifier. In some embodiments and scenarios, this has the beneficial effect that the posting display webpage is only send to those computer systems, i.e. botnet clients, which know about the unique identifier, i.e. the computer system that has send the request message requesting the original posting. The respective unique identifier is sent the source address of the request message that has requested the respective posting. Thus, in some embodiments and scenarios, the payload provided by the respective request message is inhibited from being sent to other client computer systems.

According to embodiments of the present invention, the embodiments are configured to receive a fourth request message directed to the first URL of the first website and analyzing the fourth request message by: extracting the source address of the fourth request message, determining whether the fourth request message requests to receive an entry webpage of the first website, and sending the requested entry webpage to the source address of the fourth request message in response to determining that the fourth request message requests to receive the entry webpage of the first website. In some embodiments and scenarios, this has the beneficial effect that entry webpage is provided for spam computer systems that first explore a website before posting spam thereon.

According to embodiments of the present invention, a first set of pre-fabricated template elements includes one or more of the following elements: a title including a topic indicator and a message board indicator, a frequent activity indicator, an indicator of a number of members, a social network reference indicator, a link to a second website mimicking a virtual message board, a dynamic webpage content filler element including a pre-fabricated text block, and an email address of a spam trap. In some embodiments and scenarios, this has the beneficial effect that, for a botnet client, websites mimicking virtual message boards are not distinguishable from authentic message boards.

According to embodiments of the present invention, an entry webpage of a first website includes a list of threads related to the topic of the first website, each thread being linked to a posting webpage of the first website, and a link for creating a new topic linked to a further posting webpage of the first website. According to embodiments of the present invention, a posting webpage of the first website includes one or more of the following form fields: a name filed, an email address filed, an URL field, a posting field, and a submission field. In some embodiments and scenarios, this has the beneficial effect that, for a botnet, an entry webpage and a posting webpage is not distinguishable from authentic message boards.

According to embodiments of the present invention, the embodiments are configured to generate one or more second websites, each second website mimicking a virtual message board, using for each second website a second set of pre-fabricated template elements selected from the set of pre-fabricated templates, assigning each of the second website with a second URL generated using a second domain name selected from the set of available domain names. In some embodiments and scenarios, this has the beneficial effect in that a plurality of websites mimicking a virtual message board are generated.

According to embodiments of the present invention, the embodiments are configured to receive a fifth request message directed to a third URL, extracting the source address of the fifth request message, checking whether the third URL includes one of the domain names of the set of available domain names, generating a third website mimicking a virtual message board using a third set of pre-fabricated template elements selected from the set of pre-fabricated templates and assigning the third website with the third URL in response to determining that the third URL includes one of the domain names of the set of available domain names. In some embodiments and scenarios, this has the beneficial effect that the third website is automatically generated in a form adapted to a received request. In response, in some embodiments and scenarios, the requesting computer system, e.g. a botnet client, requests to add a spam posting to the third website.

According to embodiments of the present invention, the embodiments are configured to send an error message to the source address of the fifth request messages in response to determining that the third URL includes none of the domain names of the set of available domain names. In some embodiments and scenarios, this has the beneficial effect that the botnet client receiving the error message is deterred from retrying to post spam-related content.

According to embodiments of the present invention, the embodiments are configured to check whether a third domain name included by the third URL is available for purchase in response to determining that the third URL includes none of the domain names of the set of available domain names and purchasing the respective third domain name in response to determining that the third domain name included by the third URL is available for purchase. In some embodiments and scenarios, this has the beneficial effect that domain names interesting for spammers are provided, thereby attracting spam postings.

According to embodiments of the present invention, the third domain name is purchased after a pre-defined number of fifth request messages directed to the third URL have been received, which were not included by the first or second URLs. In some embodiments and scenarios, this has the beneficial effect that the most interesting domain names are purchased. Thus, by applying the respective domain names a large number of spam postings are attracted.

According to embodiments of the present invention, the embodiments are configured to protect a virtual message board website from spam postings, the protection includes:

providing a blacklist of spam source addresses, receiving a sixth request message directed to a URL of the virtual message board website, extracting the source address of the sixth request message, checking whether the extracted source address of the sixth request message is included by the blacklist of spam source addresses, and blocking the sixth request message from being relayed to the virtual message board website in response to determining that the extracted source address is included by the blacklist of spam source addresses. In some embodiments and scenarios, this has the beneficial effect that the method is further used for protecting a virtual message board website from spam postings.

According to embodiments of the present invention, the further protection includes: determining whether a payload of the sixth request message includes spam or malware related elements, and blocking the sixth request message from being relayed to the virtual message board website in response to determining that the respective payload includes spam or malware related elements. In some embodiments and scenarios, this has the beneficial effect that spam or malware-related elements are inhibited from being relayed to the protected virtual message board website.

FIG. 1 depicts a first schematic block diagram, 100, illustrating a network including a emulated forum server for attracting and analyzing spam postings, in accordance with an exemplary embodiment of the present invention.

The network depicted in FIG. 1 includes emulated forum server 108 for attracting and analyzing spam postings. Spam system 102 controls a plurality of botnet clients 104, 106 to post messages on virtual message boards like the websites provided by emulated forum server 108, which mimics virtual message boards. The messages posted by botnet clients 104, 106 results in emulated forum posts 110. Emulated forum posts 110 are processed and the resulting spam-related data, such as spam source addresses or spam-related URLs, are transferred to anti-spam system 112. Anti-spam system 112 generates blacklists 114 for spam protection software including the spam-related data harvested by emulated forum server 108.

Emulated forum server 108 is, for example, deployed as a reverse proxy to a web server hosting a social community. In order to provide a virtual honey pot for attracting spam postings, emulated forum server 108 will: automatically generate honey pot templates (e.g., based on a rotating list of topics) and advertise them to search engines and internet directory sites; simulate a social network community by creating and delivering specially drafted websites based on incoming requests, wherein each drafted website provides a structure which contains specific simulated features which are common feature for such social network community websites and wherein communication between emulated forum server 108 provides the virtual honey pot and a connecting client is following the communication conventions for such social network community websites; analyze incoming requests derived from a communication between a connecting client and emulated forum server 108 providing the honey pot by extracting the HTTP headers and payload for evaluation of malicious content or references to malicious content; identify and protect against known malicious content by recording IP addresses of clients which content is captured for analysis and reject further requests by the respective clients; deliver extracted URLs and IP addresses to an analysis component for automatic creation of protection updates to customers.

Figure 2:
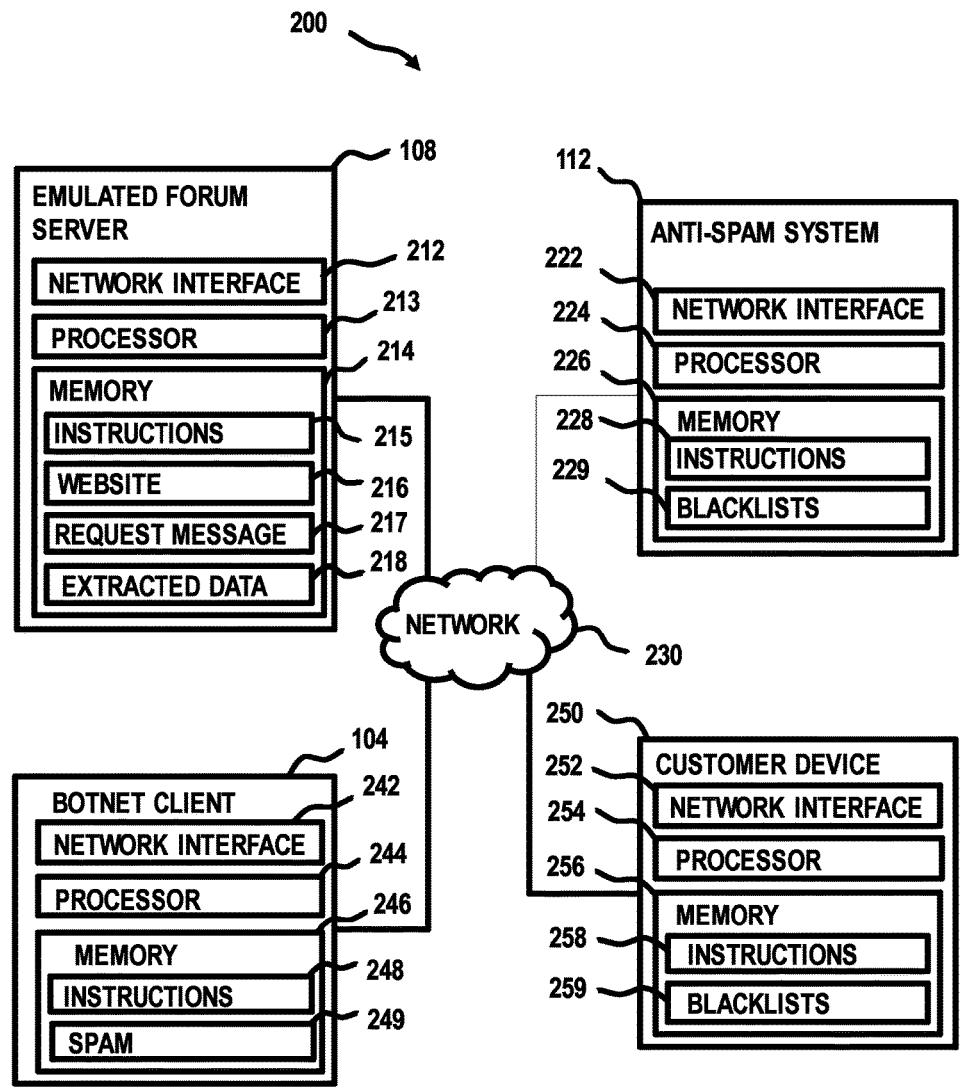
FIG. 2 depicts a second schematic block diagram illustrating a network including a emulated forum server for attracting and analyzing spam postings, in accordance with an exemplary embodiment of the present invention.

FIG. 2 depicts a second schematic block diagram, 200, illustrating a network including emulated forum server 108 for attracting and analyzing spam postings, in accordance with one embodiment of the present invention.

In various embodiments of the present invention, emulated forum server 108 is a computing device that can be a standalone device, a server, a laptop computer, a tablet computer, a netbook computer, a personal computer (PC), or a desktop computer. In another embodiment, emulated forum server 108 represents a computing system utilizing clustered computers and components to act as a single pool of seamless resources. In general, emulated forum server 108 can be any computing device or a combination of devices with access to the software and data used to practice embodiments of the present invention and is capable of executing software used to practice embodiments of the present invention. Emulated forum server 108 may include internal and external hardware components, as depicted and described in further detail with respect to FIG. 9.

In this exemplary embodiment, instructions 215, website 216, request message 217, and extracted data 218 are stored on emulated forum server 108. However, in other embodiments, instructions 215, website 216, request message 217, and extracted data 218 may be stored externally and accessed through a communication network, such as network 230. Network 230 can be, for example, a local area network (LAN), a wide area network (WAN) such as the Internet, or a combination of the two, and may include wired, wireless, fiber optic or any other connection known in the art. In general, network 230 can be any combination of connections and protocols that will support communications between emulated forum server 108, instructions 215, website 216, request message 217, and extracted data 218, in accordance with a desired embodiment of the present invention.

Emulated forum server 108 includes memory 214 with machine executable instructions 215, processor 213 for executing the machine executable instructions 215 and network interface 212 for receiving and sending data, e.g. via network 230. Execution of machine executable instructions 215 by processor 213 causes processor 213 to control emulated forum server 108 for attracting and analyzing spam postings. Emulated forum server 108 is connected to network 230 and receives request messages from botnet client 104.

Memory 214 further includes one or more websites 216 mimicking virtual message boards provided via the network 230. Emulated forum server 108 receives request messages 217 from the botnet client 104, analyzes the received messages 217, and extracts spam-related data 218 like the source address of the messages 217, i.e. the IP address of the botnet client, or spam-related URLs included e.g. by the payload of the messages 217. The extracted data 218 is delivered to anti-spam system 112 to update blacklists 219 of spam-related IP addresses and spam-related URLs. The extracted data 218 is, for example, sent to anti-spam system 112 via the network 230 or via a direct data connection (not shown) by wired or wireless transmission.

Anti-spam system 112 includes memory 226 with machine executable instructions 228, processor 224 for executing the machine executable instructions 228 and network interface 222 for receiving and sending data, e.g. via network 230. Execution of machine executable instructions 228 by processor 224 causes processor 224 to control anti-spam system 112 in order to perform an update of the blacklists 229 included by memory 226. For updating blacklists 229, spam-related data 218 provided by emulated forum server 108 is used. The updated blacklists 229 are implemented in updates for spam protection software and provided to costumer device 250 via network 230.

Customer device 250 includes memory 256 with machine executable instructions 258, processor 254 for executing the machine executable instructions 258 and network interface 252 for receiving and sending data via network 230. Machine executable instructions 258 include instructions of an anti-spam software for protecting customer device 250 against spam. Memory 256 may further include blacklists 259 of spam-related IP addresses and/or URLs. Blacklists 259 are updated with updates provided by anti-spam system 112 via network 230.

The botnet client 104 includes memory 246 with machine executable instructions 248, processor 244 for executing the machine executable instructions 248 and network interface 242 for receiving and sending data via network 230. Execution of executable instructions 248 by processor 244 causes processor 244 to generate spam messages 249 and send the respective spam messages via network 230 to emulated forum server 108.

Figure 3:
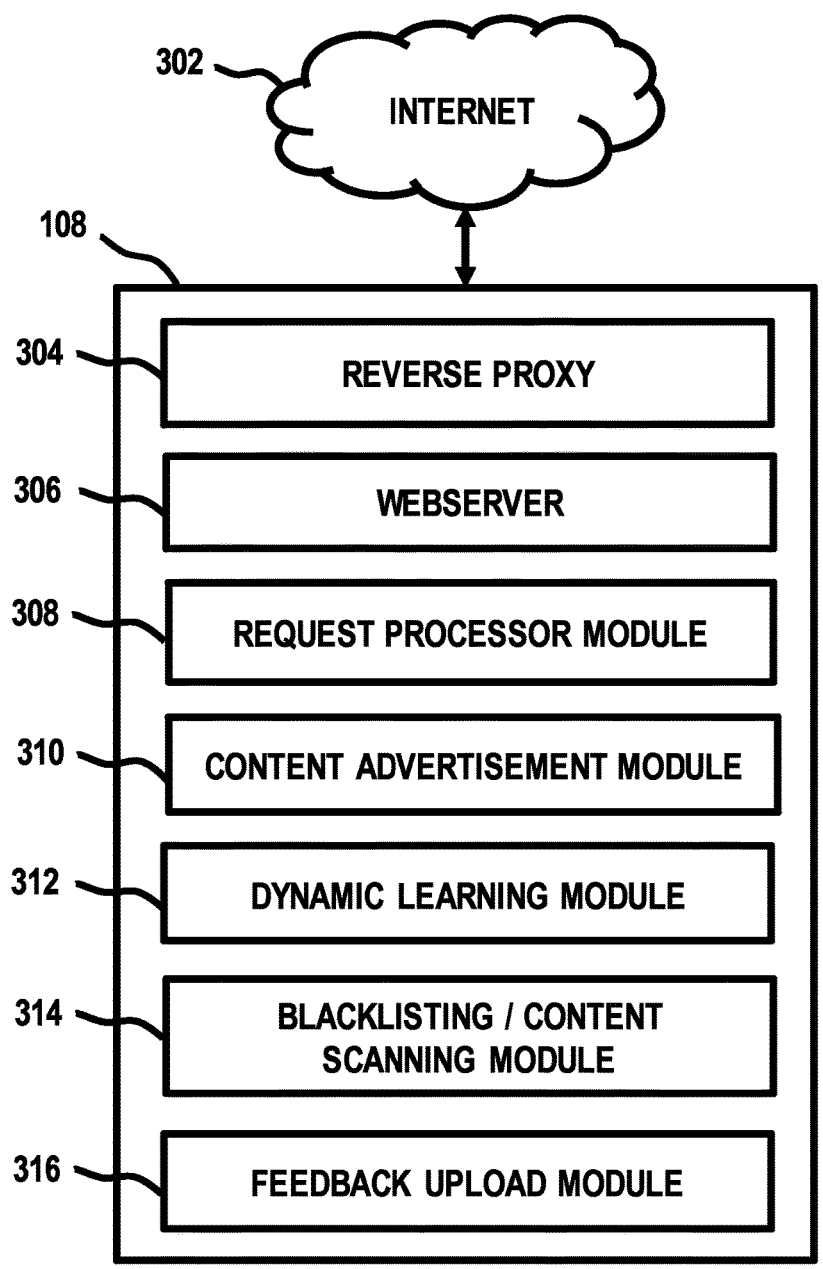
FIG. 3 depicts a first schematic diagram illustrating an emulated forum server for attracting and analyzing spam postings, in accordance with an exemplary embodiment of the present invention.

FIG. 3 depicts a first schematic diagram illustrating emulated forum server 108 for attracting and analyzing spam postings, in accordance with an exemplary embodiment of the present invention.

In FIG. 3, emulated forum server 108 is connected with a public network like the Internet 302 and includes a plurality modules working in concert to attract and analyze spam postings, thereby providing protection and/or capture capabilities regarding request messages received by emulated forum server 108. Emulated forum server 108 includes the following components: Reverse proxy 304, webserver 306, request processor module 308, content advertisement module 310, dynamic learning module 312, blacklisting/content scanning module 314 and feedback upload module 316. These modules will now be explained in further detail.

In various embodiments, Reverse proxy 304 is configured to capture incoming requests and make decisions on how to handle those requests based on the deployment scenario. In various embodiments, reverse proxy 304 is an off-the-shelf component. Reverse proxy 304 is configured to listen on specific HTTP ports such as 80, 443, 3128, 8080, 8081 and 8181. Reverse proxy 304 redirects all received requests, which are either to be captured directly or scanned in detail to request processor module 308 and, in case emulated forum server 108 is implemented as a honey pot shield as shown in FIG. 6B, relay all benign requests to their target destination. Reverse proxy 304 communicates with request processor module 308 over a standard protocol such as ICAP or eCAP.

In various embodiments, the Webserver 306 delivers dynamic websites to an outside client. This Webserver 306 may be any kind of off-the-shelf server product such as Microsoft IIS with ASP support enabled. However, various embodiments are implemented with any other kind of Webserver 306 that is configured to deliver active content, e.g., an APACHE HTTP server with PHP. The Webserver 306 is used to deliver specifically crafted websites based on the incoming requests, cf. request processing workflow, as described later in this document.

In various embodiments, the request processor module 308 is a component configured to analyze incoming request messages. For example, the request processor module 308 extracts HTTP headers and payload of a given received request and conducts an analysis of the extracted data content. The request processor module 308 is deployed on the same system as the reverse proxy 304 or on a separate/remote system. In other words, emulated forum server 108 may be implemented as a distributed system, including a plurality of sub-systems. In various embodiments, the request processor module 308 is written in the PYTHON ("Python" is a registered trademark of the PSF) scripting language. In other embodiments, the request processor module 308 is implemented in other suitable languages such as C++ or JAVASCRIPT ("JavaScript" is a registered trademark of Oracle and/or its affiliates) via node.js. In some embodiments, the request processor module 308 communicates with the reverse proxy 304 via ICAP or eCAP.

In various embodiments, content advertisement module 310 is a component of emulated forum server 108 playing a double role. On the one hand, content advertisement module 310 regularly generates new honey pot templates, i.e. sets of pre-fabricated template elements, using, for example, a rotating list of topics, such as sports, shopping or healthcare. On the other hand, content advertisement module 310 also advertises the potentially available websites mimicking virtual message boards, which are generated using the honey pot templates, to search engines and internet directory sites. In various embodiments, content advertisement module 310 is written in the PYTHON scripting language, but also is implemented in other suitable language such as C++ or JAVASCRIPT via node.js in alternative embodiments.

Various embodiments use specifically crafted websites mimicking virtual message boards to emulate, for example, a community space such that the emulated community space is believable enough for a spam botnet client to accept it as a "real" community space. These websites are optimized to offer easily-reachable forms to post messages as well as indicate activity and popularity of the emulated virtual message boards.

In some embodiments and scenarios, to ensure content advertisement module 310 module 319 properly advertises the websites, the websites often include one or more the following key elements:

A title containing a topic, e.g., "sports", "shopping", "software", etc., and a trigger word indicating that the website provides a community space, e.g., "forum", "message board", "bulletin board", "comments" or "chat";

An indicator of the most recent post indicating frequent activity, e.g., "Last post 28 minutes ago" or "Last updated Jul. 30, 2015", etc. According to some embodiments of the present invention, the respective date or indication is randomly chosen as long as it is: 1) within the last 30 minutes, 2) valid, i.e., in a valid format and not at a future date, and 3) updated on every query of the webpage including the respective indicator;

An indicator of the member size of the community space, e.g., "29544 registered members". This number is chosen randomly, but preferably needs to be at least 10000 to indicate a significant mindshare. The respective number should further be dynamic, i.e. update repeatedly by a new value, preferably an increased value;

References to social networks, e.g., "14324 Tweets" or "5877 likes". These numbers are again chosen randomly, but preferably should be in the order of thousands or more;

Links to "partner" websites which optionally link to further websites provided by content advertisement module 310 as botnet clients may automatically crawl to such links, when looking for additional targets. The links provided on websites mimicking virtual message board are not directed to legitimate websites;

Dynamic page filler content elements made randomly using pre-fabricated text blocks that are loosely attributed to the topic chosen for the respective website, e.g. similar to a lorem ipsum filler text; and Email addresses of spam honey pots, i.e. spam traps. Those email addresses are harvested by the botnet clients in order to send spam messages or to crawl for potential targets. This allows cross-linking with other spam harvesting methods.

The content of all of these elements are aligned with a given topic chosen by content advertisement module 310 for a given honey pot, i.e. website. Furthermore, the respective topic is chosen based on a request message received from a botnet client. For example, if a website generated and publicized with the "shopping" topic is requested by an external client, a respective website mimicking a virtual message board prepared with "shopping" title and content is provided.

In various embodiments, the content of the websites is prepared for different languages. The content advertisement module 310 chooses to deploy honey pots in different languages, such as Chinese, Japanese, English, Spanish, and German. In case a website that has been generated and publicized in Japanese is requested by an external client, the webpages included by the respective website is filled with pre-fabricated Japanese text blocks. Furthermore, links and indicators included by these webpages are also adapted to the language requested. For example, "Last post 28 minutes ago" is displayed as "Letzter Beitrag vor 28 Minuten" in case a website in German is generated. A button labeled "Create new Topic" or "Respond" is labeled as "Neues Thema erstellen" and "Antworten" in German.

For, example, the websites generated and used by emulated forum server 108 are split by purpose as follows: Overview webpage, posting webpage and posting display webpage. These types will now be explained in further detail.

The overview webpage mimics a message board entry webpage. The respective webpage may list a plurality of threads relating to the topic of the respective website. The thread titles are chosen randomly from a list of pre-fabricated titles. Each thread is linked to a posting webpage of the respective website. Additionally, a link labeled "Create new Topic" is included, also linking to a posting webpage of the respective website. The respective website and webpage topics are randomized for every request.

The posting webpage mimics a message board webpage configured for adding a response or creating a new thread. For example, it includes one or more of the following form fields:

"name" which is a standard input field expected by botnet clients;

"email address" which is a common input field. It is filled with randomized email addresses, but sometimes yields the same fake email addresses that spammers later use to deliver spam messages, like spam emails, as they tend to use the same generators for forum posts and spam message sending;

"URL" which is a rather uncommon input field, but one that is liked by spammers. If it is present, it is typically filled with a valid spam URL;

"comment" or "content" (randomized choice) which are standard input fields, expected by botnet clients in order to add the main payload of the spam posting;

"submit" or "create post" (randomized choice) buttons, which are standard interface element expected by botnet clients in order to activate or confirm the respective posting.

Depending on the request message traffic experienced by emulated forum server 108, a size limit is imposed on the above input fields. For example, the "comment" is limited to 2048 characters and all other fields are limited to 256 characters. Generally, this is not necessary as spammers tend to conserve traffic, i.e., only delivering a minimum amount necessary. However, there have been instances of overly excessive, corrupt posts which are, for example, attributed to faulty or buggy botnet codes.

The posting display webpage is used to retrieve posting added to the emulated virtual message board earlier by a botnet client. In some scenarios and embodiments, it is similar to a posting page with the addition of a text field containing the sanitized text of the posting. For example, the text is sanitized by deleting all URLs and/or malware elements from the original posting sent by the botnet client. This page is mainly used to pass automated quality checks of spam bots that verify whether their payload has been successfully posted.

Dynamic learning module 312 is a component of emulated forum server 108 that observes requests received by the reverse proxy 304 that are neither targeting a valid, protected community space, in case of a honey pot shield implementation, nor being part of the list of generated honey pot templates (see content advertisement module 310). Dynamic learning module 312 records which non-covered paths, i.e. target URLs, are being requested by messages received and automatically cause content advertisement module 310 to generate and advertise websites based on keywords found in the request path.

Dynamic learning module 312 is notified by the request processor module 308 of any paths that cannot be serviced, because no honey pots were created by content advertisement module 310 on the respective domain/path. For the sake of simplicity dynamic learning module 312 is written in the PYTHON scripting language, but is also implemented in any other suitable language such as C++ or JAVASCRIPT via node.js.

In the case that the request processor module 308 cannot locate a valid website because a botnet client has requested a previously unknown domain or path, the request processor module 308 notifies dynamic learning module 312 of both domain name and URL used. The request processor module 308 further responds with a "404 NOT FOUND" status to the reverse proxy 304, which in turn responds to the botnet client with a "404 NOT FOUND" status.

Dynamic learning module 312 performs one or more of the following checks to determine how to react on a "404" report:

1. The used domain is available to emulated forum server 108: In this scenario, dynamic learning module 312 triggers the creation of a new website mimicking a virtual message board by content advertisement module 310. Dynamic learning module 312 will furthermore scan the used domain name and URL path, checking whether any of the topics already supported, e.g., "sports", "shopping", etc., was used. If this is the case, dynamic learning module 312 updates the topic lists to create honey pots with these topics more often. For example, the respective topic is added to the respective list such that the list includes the respective topic more than once. Alternatively, the respective topic is assigned with a larger weighting factor increasing the probability that the respective topic is selected.

2. The domain is not available to emulated forum server 108: In this scenario, dynamic learning module 312 notifies the operator that a specific domain should be purchased for future use. If the domain provider used by the operator allows automatic domain purchasing via API, dynamic learning module 312 automatically orders the purchase of the specific domain name and orders the domain reports to point to the external IP address of emulated forum server 108. Dynamic learning module 312 notifies the operator about the purchase. According to embodiments of the present invention, dynamic learning module 312 has a certain threshold of "404" incidents per domain name before an auto-purchase is initiated, e.g. only if a domain name was missed more than 10 times within the last 24 hours the same is auto-purchased.

Blacklisting and content scanning module 314 provides an active identification of and protection against known malicious content (i.e., spam or malware related content) by recording the source addresses (e.g., IP addresses) of clients whose content is captured by the request processor module 308 and rejecting further requests from the respective source address upon connection. Blacklisting and content scanning module 314 further provides advanced content scanning by offering content scanning of payloads using existing off-the-shelf classification technology such as IBM's SCA SDK. In case a given payload is identified as malicious (i.e. containing spam or malware related elements), blacklisting and content scanning module 314 prompts the reverse proxy 304 to terminate the transaction, thus preventing the request message from reaching a protected community space.

Feedback upload module 316 delivers extracted URLs, IP addresses and binary attachments to an anti-spam system provided by, for example, an anti-spam research data center for automatic creation of updates for an anti-spam protection software. Feedback upload module 316 ensures that findings are not constrained to emulated forum server 108, but instead benefit a large populace of users of the respective anti-spam protection software. As with the other modules, feedback upload module 316 is, for example, written in PYTHON, but is also be implemented in any other suitable programming and/or scripting language in various embodiments.

Feedback upload module 316 receives extracted URLs, IPs and any binary attachments as located by the request processor module 308. Feedback upload module 316 stores the received data in separate transaction packages that are unique for each request captured.

In short pre-defined intervals of time (e.g., in 15-seconds intervals) feedback upload module 316 packages all accumulated transaction packages into a feedback package and uploads the feedback package to a pre-defined drop-off point, e.g., in an anti-spam research data center. In various embodiments, this is implemented by an FTP share, HTTP REST API or similar.

Feedback upload module 316 deletes any successfully uploaded transaction and feedback packages and automatically retries any failed uploads within a pre-defined interval of time, e.g. 30 seconds. This allows feedback upload module 316 to trigger the creation and delivery of anti-spam protection software updates by the data center ensuring protection for all customers, not just the systems protected by emulated forum server 108.

Since feedback upload module 316 is configured to receive spam-related data very quickly after spam messages have been posted on the emulated virtual message board, the respective data can arrive at the data center very quickly, e.g., within 60 seconds of being deployed by a botnet. In turn, the data center is enabled to begin distributing updates very quickly (e.g. within two minutes) creating an overall turnaround delay of less than three minutes in this example. This is an improved speed advantage compared to traditional crawling that usually requires hours, if not days or weeks, to locate a new posting in a potentially obscure community space.

Figure 4:
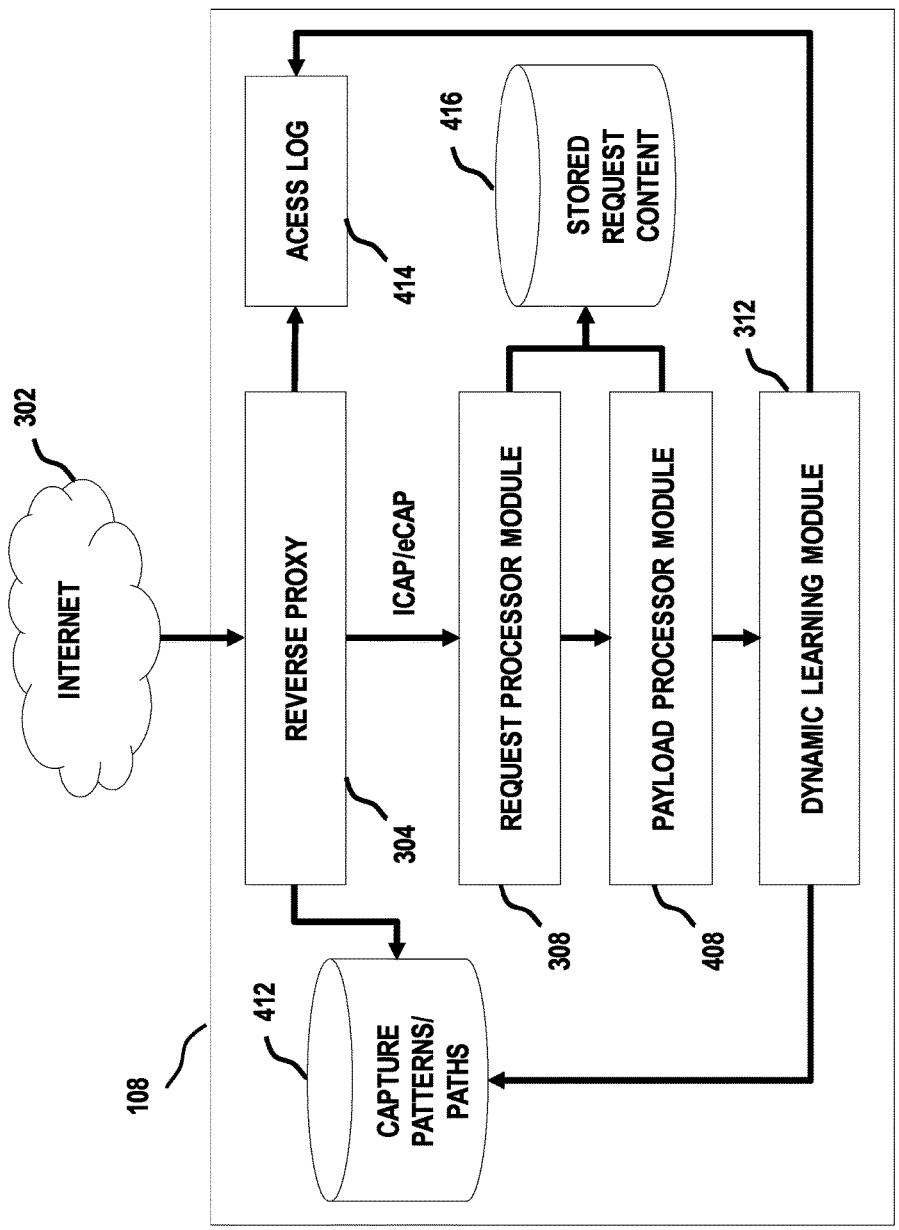
FIG. 4 depicts a second schematic diagram illustrating an emulated forum server for attracting and analyzing spam postings, in accordance with an exemplary embodiment of the present invention.

FIG. 4 depicts a second schematic diagram illustrating emulated forum server 108 for attracting and analyzing spam postings, in accordance with an exemplary embodiment of the present invention.

As stated earlier, emulated forum server 108 is connectible with a public network such as the Internet 302. In the FIG. 4 schematic diagram, emulated forum server 108 includes reverse proxy 304, request processor module 308, payload processor module 408 and dynamic learning module 312.

Reverse proxy 304 listens on common HTTP ports, e.g., 80 or 443, and transfers incoming requests to request processor module 308. To determine which requests are to be transferred, a pre-compiled list of patterns and fixed URL paths are used in addition to a list of IPs blacklisted by request processor module 308. The respective list of patterns/paths included by capture patterns/paths database 412 is, if necessary, appended by the dynamic learning module 312. Using this approach, post attempts from suspicious IP addresses are automatically harvested, while allowing granular access to services protected behind reverse proxy 304. Protocols such as ICAP or eCAP are used to facilitate communication.

In various embodiments, request processor module 308 includes an ICAP/eCAP interface to connect to reverse proxy 304. Furthermore, request processor module 308 may include of a stored request content database 416, containing previously received requests. Request processor module 308 has a repository of HTML templates available to respond according to the request types received. Further, it has capture patterns/paths database 412 available which is used to determine the type of request received.

If a new incoming request is received via the interface, the request processor 404 uses the request pattern database to determine which of the following request types is being handled:

For GET-requests, a generic, randomized HTML-listing of "posts" similar to a message board is returned. For GET-requests having a path or parameters indicating an attempt to locate a "content post" form: A generic HTML-based form that looks similar to a form used to post data is returned. For GET-requests that have an ID generated by the invention, e.g., POST/PUT requests: A generic HTML page is returned containing the content posted earlier for that ID. The connection has to come from the same IP address, subnet or in a very short time window after posting (e.g., 2 mim) to avoid actually becoming a spam message hosting system.

If none of these criteria match, emulated forum server 108 presents a "content post" form with a generic "Sorry, something went wrong with your post. Please try again." message.

For GET-Request having parameters indicating someone is trying to post content: Handled to similar "POST/PUT" requests, the data to be posted is extracted from the GET parameters.

For POST/PUT-Requests, a request ID is generated. The post payload is read and stored under that request ID. The IP is blacklisted within the invention and also exported as IP reputation/blacklisting information to other instances of the invention as well as products able to consume IP reputation info. A generic "HTTP 200 OK" confirmation message is returned to the external peer.

Payload processor module 408 reads the stored request payload and extracts stored URLs. It does this by looking for telltale signs such as "http" as well as a selection of regular expressions to capture camouflaged URLs. All extracted URLs are handed over to a crawler agent which will process and categorize them.

In various embodiments, reverse proxy 304 only answers to URLs on its list of patterns and paths. Anything that does not match the path is either sent to an upstream HTTP server or answered with a "HTTP 404 NOT FOUND". To be able to react to new and unknown URL requests the dynamic learning module is invoked whenever a "404" error is recorded. If a certain URL path and/or pattern is called repeatedly and causing a "404", dynamic learning module 312 automatically adds the path to reverse proxy 304 list of items to be forwarded to request processor module 308. Additionally, if using an upstream HTTP server, the dynamic learning module 406 checks whether any of the paths on the reverse proxy list are served by the upstream HTTP. This typically happens if a community forum/bulletin board is actually deployed to the service. In this case, the entry is removed from reverse proxy 304 list to allow access to the service on the upstream HTTP. Emulated forum server 108 further includes an access log 414 listing all external accesses.

Figure 5:
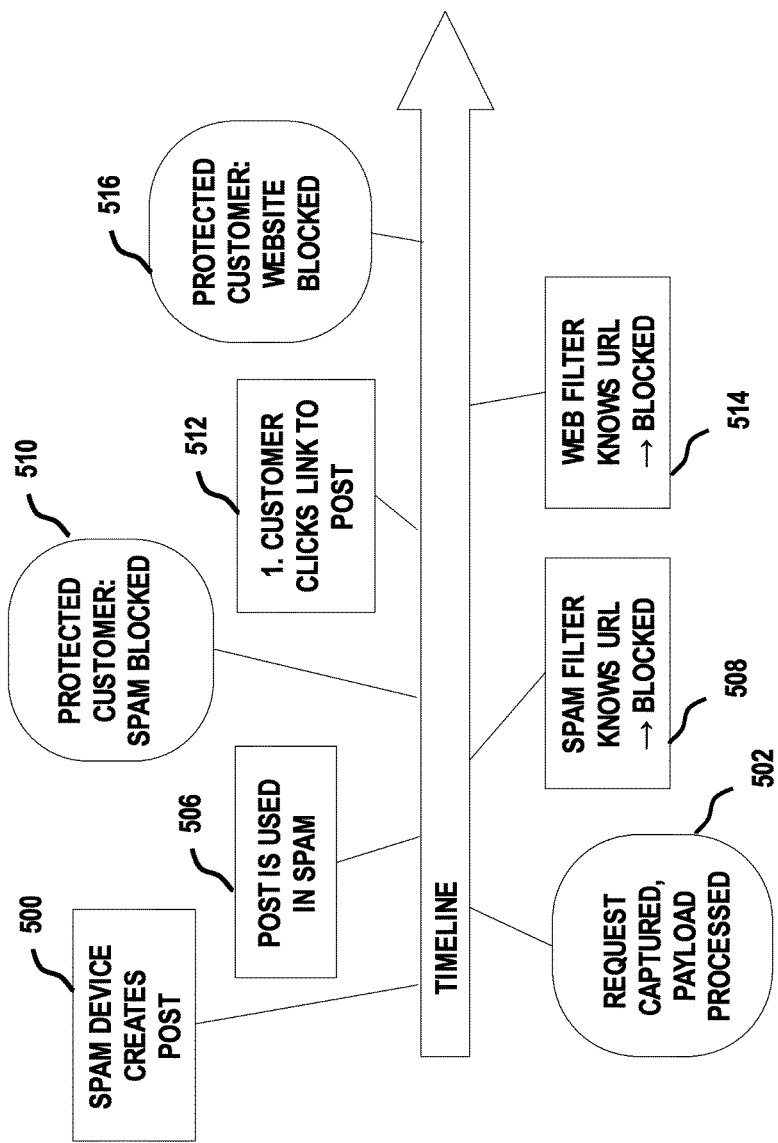
FIG. 5 illustrates a first example of operational processes for attracting and analyzing spam postings, in accordance with an exemplary embodiment of the present invention.

FIG. 5 illustrates a first example of operational processes for attracting and analyzing spam postings, in accordance with an exemplary embodiment of the present invention. The arrow indicates the timeline. In block 500, a spam post is created by a spam computer device like a botnet client 104. In block 502, a request message for generating a post on an emulated virtual message board according to the present invention is captured. The payload is processed and spam-related data extracted. The extracted data is used to update an anti-spam filter. In block 506, the spam computer device uses the post created before in a spam campaign. However, the updated spam filter in block 508 knows the spam-related URLs. Thus, in block 510 the customer is protected and the spam blocked. When a first customer clicks a link to a spam post in block 512, the URLs leading to spam websites are blocked in block 514, since the web filter already knows the respective URLs. Thus, the customer is protected in block 516 with the spam websites being blocked.

Figure 6A:
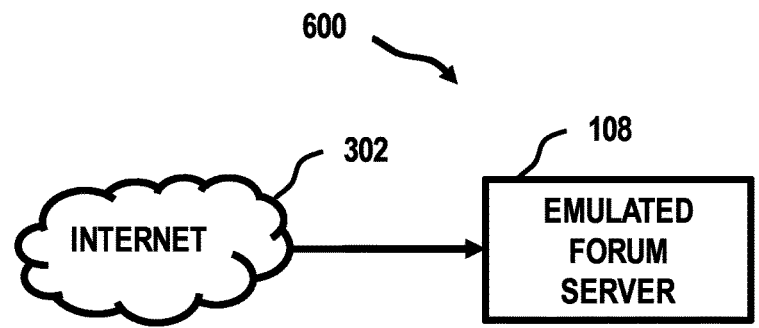
FIGS. 6A and 6B depict schematic diagrams illustrating two implementations of an emulated forum server for attracting and analyzing spam postings, in accordance with an exemplary embodiment of the present invention.
Figure 6B:
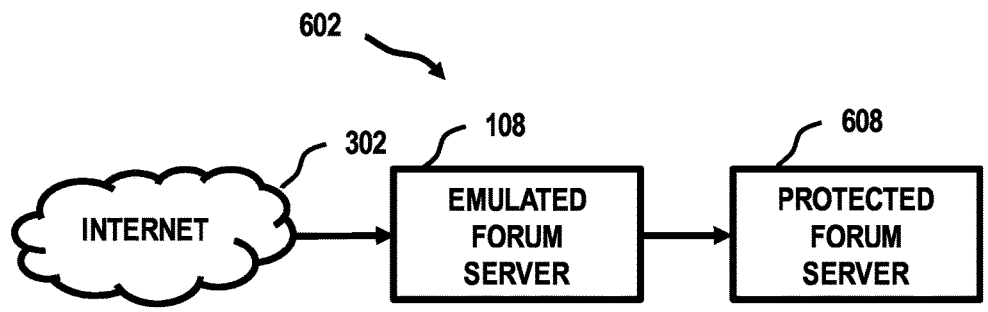

FIGS. 6A and 6B depict schematic diagrams illustrating two implementations of emulated forum server 108 for attracting and analyzing spam postings, in accordance with an exemplary embodiment of the present invention.

FIGS. 6A and 6B show schematic diagrams illustrating two exemplary implementations 600, 602 of emulated forum server 108 for attracting and analyzing spam postings also referred as emulated forum server. FIG. 6A shows an implementation 600 as a standalone honey pot. In this implementation 600, emulated forum server 108 connected with the Internet 302 and providing a honey pot for spam postings works independent of other infrastructure systems and, for example, are deployed as a virtual machine on an infrastructure-as-a-service cloud host, e.g., IBM softlayer. Emulated forum server 108 captures all incoming requests from the Internet 302 regardless of their path used, i.e., their target URL.

FIG. 6B shows an alternative implementation 602 as a honey pot shield. In some embodiments and scenarios, emulated forum server 108 is connected with Internet 302, and provides a honey pot "in front" of an existing virtual message board like a respective website or community space. This virtual message board is hosted on a separate protected forum server 608 as shown in FIG. 6B or on emulated forum server 108. Emulated forum server 108 includes a proxy server capturing all incoming requests targeted at one or more domains, i.e. URLs including a respective domain name, the community space is hosted on. In difference to the standalone deployment 600 shown in FIG. 6A, the honey pot shield 602 of FIG. 6B monitors incoming requests and reacts differently depending on whether the path requested by the message is a valid location in the community space or not.

In case an incoming request is targeted at an invalid location, e.g., a non-existent URL, the implementation 602 behaves identical to the standalone honey pot 600, capturing the request for spam detection processing. In case the incoming request is targeted at a valid location the implementation 602 first checks whether the source address (e.g., IP address) of the connecting peer is on a blacklist of spam-related source addresses. If this is the case, the request is captured for processing and not let through to the community space. The implementation 602 then applies additional scanning on the request, e.g. analyzing its payload, if present, for known spam- or malware-related elements. If a spam- or malware-related element is detected, the request is also captured and not let through. If the incoming request is not captured due to this initial check, respective is let through to its intended destination, e.g. the protected community space. In this regard, emulated forum server 108 works similar to a reverse proxy with content scanning, shielding the community space from malicious content.

Figure 7:
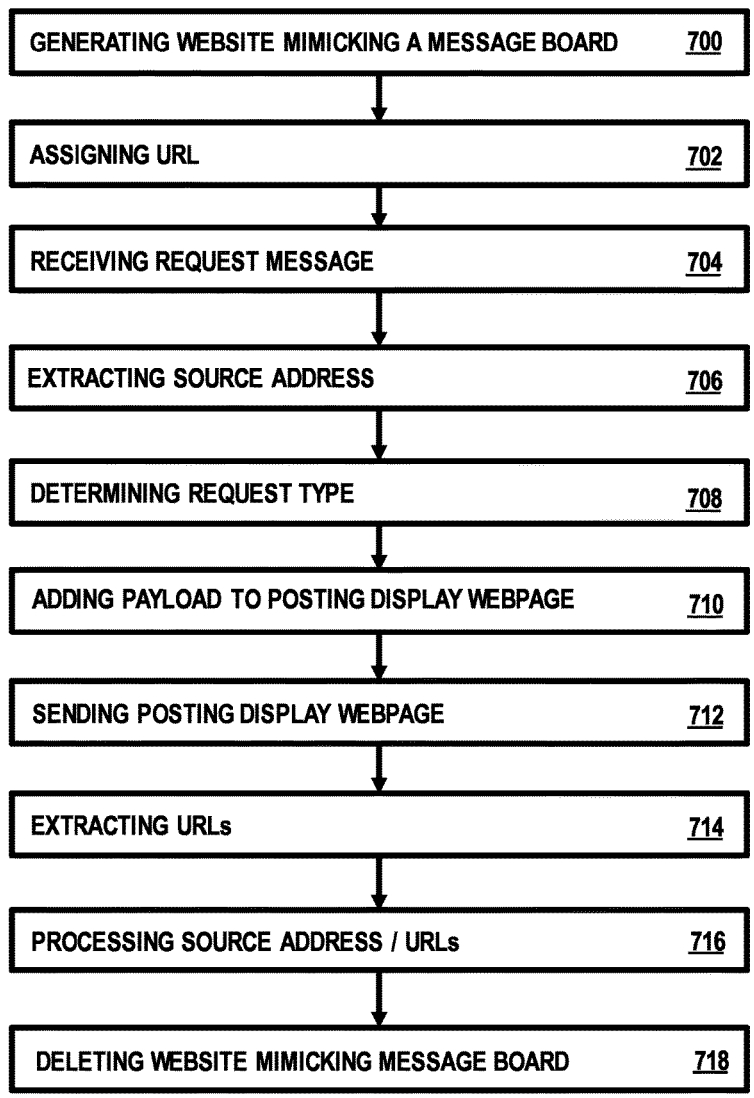
FIG. 7 illustrates a second example of operational processes for attracting and analyzing spam postings, in accordance with an exemplary embodiment of the present invention.

FIG. 7 illustrates a second example of operational processes for attracting and analyzing spam postings, in accordance with an exemplary embodiment of the present invention.

In step 700, a website is generated mimicking a virtual message board. Such a generation is performed by content advertisement module 310 at pre-defined intervals. In some embodiments and scenarios, content advertisement module 310 randomly selects a topic and language from a pre-defined repository. The language may any language that will attract a spamming website, such as Chinese, Spanish, Japanese, English, German, etc. For each topic and language a set of associated, translated text blocks are provided to initialize the respective website.

For example, content advertisement module 310 selects "English" and "shopping". Based on this choice, content advertisement module 310 loads the respective English language file containing possible page titles, interface element descriptions, filler text blocks, etc. assigned to the topic shopping into memory.

In various embodiments, content advertisement module 310 initializes the website by preparing the webpage types for the respective website, i.e. entry webpage, posting webpage, and posting display webpage, with the text blocks, title, etc. and store the same in a path, from where the webserver delivers them later on upon request by an external client.

In step 702, a URL is assigned to the generated website. For this purpose, content advertisement module 310 loads a list of internet domain names that the respective emulated forum server is able to serve externally. These domain names are set up prior to emulated forum server 108 being started and point towards the IP address of emulated forum server 108 using properly configured DNS server records. The respective list of internet domain names are either randomized or grouped by topic and language. If it is grouped by topic and/or language, content advertisement module 310 preferably chooses domain names that are aligned with the topic and language chosen earlier.

Content advertisement module 310 creates a URL using the internet domain name chosen. This URL is set up using pre-defined text snippets that include universal as well as topic and/or language specific parts. For example, for the "English" topic of "shopping" content advertisement module 310 has chosen the domain name "bigshopnow24.net". It extends this domain name with a path, for example, "forum"+"threads"+ "summer_fashion_sports_2015" to form the full URL: http://www.bigshopnow24.net/forum/threads/summer_fashion_sports_2015/.

Once this URL has been formed by content advertisement module 310, it is recorded together with the chosen topic, language and webserver storage path of the webpages and provided to the reverse proxy and request processor for later capturing of incoming request messages.

Furthermore, content advertisement module 310 begins advertising the created website (e.g., in regular intervals like every 12 hours) on search engines and internet directories. This advertising is performed differently depending on target. For search engines, content advertisement module 310 posts a query with the full URL of the generated honey pot, e.g., http://search.yahoo.com/?q=http://www.bigshopnow24.net/forum/threads/summer_fashion_s ports_2015, thereby triggering the respective search engine to begin crawling the URL within minutes. In some embodiments and scenarios, this search engine advertising is beneficial, since spammers using botnet clients often use specifically crafted search queries to locate new targets using reach engines. For internet directories, e.g., dmoz.org, content advertisement module 310 uses the respective posting forms and/or APIs provided by and/or for the respective directories to publish a new websites.

In step 704, a request message is received. In case a request message is directed towards emulated forum server 108 (i.e., a URL assigned to the same), it can, for example, first be received by the reverse proxy as it is configured to provide the connection to the outside world, i.e., a public network like the Internet. Before analyzing the request further the reverse proxy extracts the source address of the request in step 706. The reverse proxy checks, using the blacklist module (e.g., via ICAP/eCAP), whether the source address (i.e. the connecting peer's IP address) is blacklisted. If this is the case, the request is handed directly via ICAP/eCAP to the request processor for capturing. If the connecting peer IP address is not blacklisted, the reverse proxy checks the HTTP path embedded in the request header, i.e. URL to which the respective request is directed. If emulated forum server 108 is deployed as a honey pot shield according to FIG. 6B, the reverse proxy needs to verify whether the request is a valid request by a benign user. The reverse proxy uses a preconfigured list of URL patterns and paths identifying valid targets for a request message.

An example of the preconfigured list is as follows:

```
/forum/*
/forum/defaultForumNew.asp
&submit=Submit+Comment
/forum/[threads|home|about]/*
/vbtn/[0-9]{4}-[0-9]{8}-[0-9]{8}-[0-9]{8}-[0-9]{4}/*
/home/forum.asp/threadreader#[0-9]{8-14}
```

In case, the request does not match any of these list entries, the respective message is treated as a message potentially originating from a botnet client and handed over e.g. via ICAP/eCAP to the request processor for capturing.

In case the request matches one of the entries, the request is handed over e.g. via ICAP/eCAP to the request processor for further analysis or let through completely unfiltered. This performance of emulated forum server 108 is configurable and is set balancing security and throughput requirements. According to embodiments of the present invention, full scanning of all request messages are preferred.

In case emulated forum server 108 is deployed as a standalone honey pot as shown in FIG. 6A, it capture each request message received and hand it over to request processor module 308 for processing.

In step 708, it is determined which type of request message the received request message is. In some embodiments and scenarios, such a determination is already triggered when potentially benign requests are verified. In this case the request processor is provided with the incoming request by the reverse proxy e.g. via ICAP/eCAP. For optimization purposes, request processor module 308 will optionally, for example, opt to only receive a portion of the incoming request using the ICAP "PREVIEW" query, requesting additional content until a final verdict is rendered.

Figure 8:
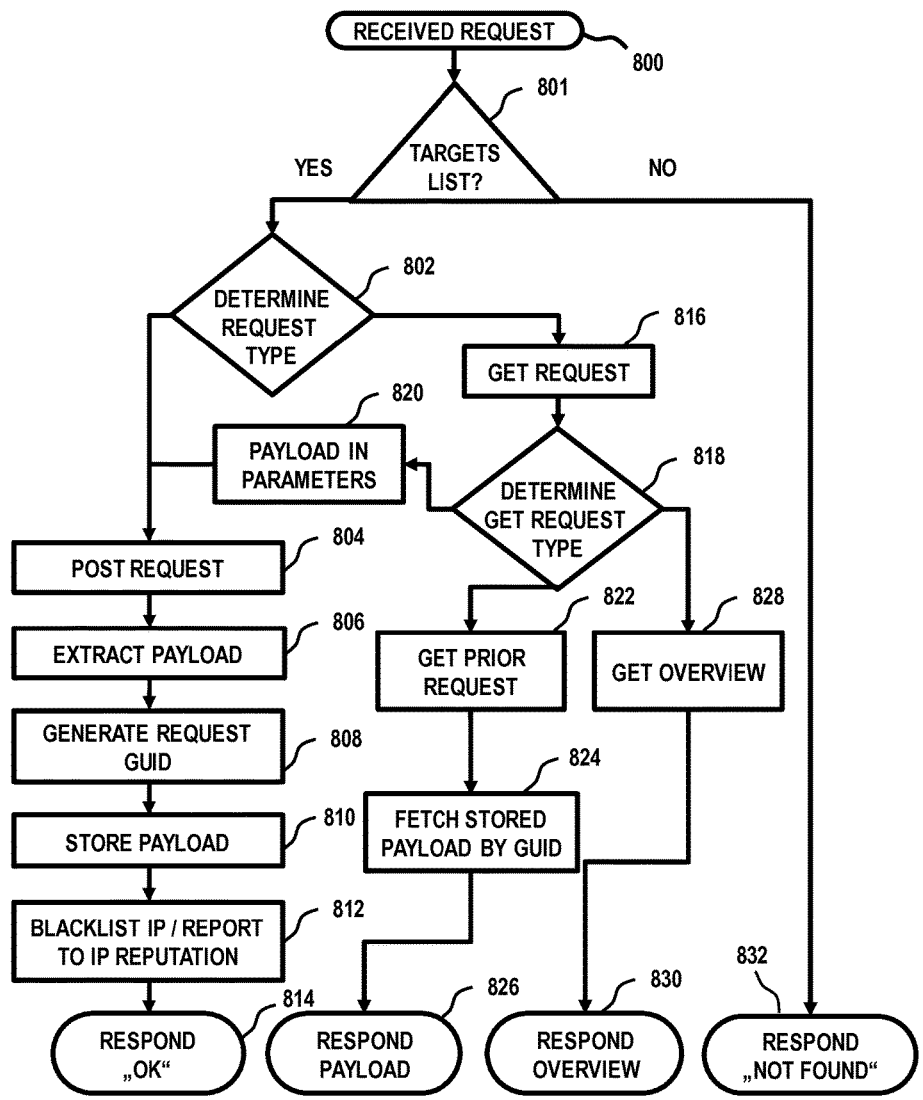
FIG. 8 illustrates a third example of operational processes for attracting and analyzing spam postings, in accordance with an exemplary embodiment of the present invention.

To conduct the respective analysis in one embodiment, request processor module 308 first differentiates between GET and POST/PUT requests. A GET request requesting data to be provided by emulated forum server 108 is, for example, detected due to an HTTP header containing a "GET [path to URL]" sequence. However, some virtual message boards support publishing of content using GET commands. While this is not in accordance with the W3C standard of proper request handling, spammers often use it anyway. Therefore, in some embodiments and scenarios, request processor module 308 is configured to scan for specific keywords and parameters in the path of the GET request, indicating a payload is delivered rather than data requested. Example keywords include: "content", "comment", "payload", "c", "body", "post" and "message". A request can, for example, look like GET /forum/messages.php?post="Buy n1ce watchs at watchs24.net". If any of these keywords is detected, the GET request is switched over to the POST/PUT branch as shown in FIG. 8.

In case the request seems to be a genuine GET request, it is let through to its intended destination. In this scenario, request processor module 308 will, for example, report a "301 Unchanged" to the reverse proxy.

A POST/PUT request is detected by its HTTP header containing a "POST [path]" or "PUT [path]". This branch of FIG. 8 is also triggered in cases where a GET request contains a payload.

In step 710, the payload is added to a posting display webpage. Request processor module 308 extracts the provided payload either from the request body, e.g. in case of a POST/PUT request, or from the identified parameter, e.g. in case of a GET request. The extracted payload is scanned for malicious content, like spam or malware related elements, using the content scanning module. In case the destination of the request is a protected message board and the content scanning module reports a suspicious finding, the request is captured for processing and not delivered to the intended destination. If the request payload is found to be unsuspicious it is delivered to the intended destination.

If a request has come from a blacklisted IP, has targeted a non-valid and/or non-existent URL path, or found to be delivering malicious content, it is captured by request processor module 308. In this case, the request does not reach its intended destination if the respective destination is a protected message board.

In case no potentially benign requests need to be verified, the step 710 is performed by request processor module 308 in response to receiving a request. This identifying of the type of request is identical to the GET/POST/PUT detection carried out in the request analysis above. Since some requests are directly relayed for capturing, they require the respective identification by request processor module 308 at this stage of request processing. For any request having passed through the respective analysis earlier, the respective identification results are re-used.

Depending on the request type, request processor module 308 will react in different ways. The request message is determined to be of the POST/PUT type. In this scenario, a botnet client is trying to post data on what it determines to be a valid message board. This request occurs as the result of a prior scanning of the website mimicking a virtual message board or is received directly. Therefore, a respective scanning and POST/PUT request does not have to be in sequence as some botnet clients directly post content without further exploring the targeted message board.

In step 710, request processor module 308 extracts the payload of the request message found in the body of the respective message, or in case of a GET request, in a parameter and store it in a temporary storage location, e.g., a database, for later retrieval. Request processor module 308 further assigns a unique identifier (UID), e.g., a globally unique identifier (GUID), to the stored payload. Request processor module 308 responds back to the reverse proxy by supplying and adding the extracted payload to a posting display webpage. Request processor module 308 also embeds the GUID into the generated webpage. The reverse proxy reacts to this by sending the generated posting display webpage to the botnet client in step 712 and closing the connection.

In the background, request processor module 308 queues the scanning of the stored payload. This queue is worked by a selection of extractor threads, which will scan the stored content for URLs and binary payloads. Detected URLs are extracted in step 714. To detect URLs, several patterns are used such as:

General URL patterns similar to "http[s]{0,1}://[a-zA-z0-9\.\-\V\:]{1,256}" (actual URL detection and validation is more complex than depicted in this illustrative schematic pattern);
Common vBulletin/WIKI tags, e.g. <URL> <IMG> <LINK>;
Base 64 encoded content pointing at binary content (EXE/ZIP, etc.);
General IP patterns similar to "[0-9]{1,3}\.[0-9]{1,3}\.[0-9]{1,3}\. [0-9]{1,3}" for IPv4 addresses.

All extracted content, i.e., source address as well as URLs, are processed in step 716. The extracted content is submitted to the feedback upload module to be delivered to an anti-spam system provided, e.g., by a spam research data center. According to embodiments of the present invention, request processor module 308 further blacklists the external peer IP address, i.e. source address, to prevent further connections. In some embodiments and scenarios, request processor module 308 is configured to opt to extract further content from the request message as needed for spam protection and/or research (e.g., any of the HTTP headers, such as user agent, referrer, request size, etc.).

In step 718, the respective website mimicking a message board is deleted. However, in some embodiments and scenarios, content advertisement module 310 is configured to delay deletion of the website, unless the system runs out of space, as botnet clients often wait for days after the discovery of a potential forum before exploiting it. In some scenarios, such an approach allows botnet clients to detect honey pot websites that are quickly recycled. In some embodiments and scenarios, in case emulated forum server 108 runs out of storage space, content advertisement module 310 is configured to, for example, delete all websites that have not been visited for more than 14 days, i.e. above a threshold.

Depending on the type of request message determined in step 708, the present method may include other and/or further steps for processing a received request message.

FIG. 8 illustrates a third example of operational processes for attracting and analyzing spam postings, in accordance with an exemplary embodiment of the present invention.

FIG. 8 provides further details regarding the analysis of, and reply to, a received message. In step 800, a request is received. In step 801, it is determined whether the received request is targeted at an URL included by a list of URLs assigned to one of the websites generated by emulated forum server 108. In case no match is found, the response "404 NOT FOUND" is send to the source address of the received message in step 832. In case a match is found and the request is directed to a URL of emulated forum server 108, the request type is determined in step 802. In case the request is determined to be a POST/PUT request in step 804, the respective request is processed as already described above for FIG. 7: In step 806, the payload is extracted. In step 808, a request GUID assigned to the respective request is generated. In step 810, the extracted pay load is stored. In step 812, the source address, e.g. IP address, of the respective message is blacklisted and reported to IP reputation, i.e. to an anti-spam system indicating that the respective IP address is spam-related. In step 814, it is responded to the source address of the received request, e.g., with a confirmation message of the form "200 OK." Alternatively or additionally, a posting display webpage including the extracted payload is sent.

In case it is determined in step 816 that the request is a GET request, the type of GET request is determined in step 818. For GET requests, request processor module 308 has to differentiate between attempts at retrieving an entry webpage according to step 828, fetching a specific prior post according to steps 822, 824, or creating a new post according to step 820. To achieve this request processor module 308 will, for example, check the query parameters for patterns that look similar to a GUID as generated as the result of a POST/PUT request and/or match pre-defined keywords that indicate posting of new entries. These keywords include, for example, "message", "new", "post", "compose", "create" or the like.

In case request processor module 308 does not find a GUID in the parameters or no parameters are found in general, the request is handled by providing an entry webpage, also referred to as an overview webpage, to the source address of the respective request message according to step 830. To this end, request processor module 308 determines the domain name and URL path of the respective entry webpage and searches for it in the database of websites deployed by content advertisement module 310. In some embodiments and scenarios, request processor module 308 is configured to load the storage path for the prepared entry webpage in the webserver directory into the memory. Afterwards, request processor module 308 queries the webserver to retrieve the stored entry webpage and relay the loaded content back to the reverse proxy, which will in turn use this to answer the client's request.

In some embodiments and scenarios, in the case where request processor module 308 has located something in the path/parameter part of the URL to which the request is directed that looks similar to a GUID possibly generated by an earlier POST/PUT request, request processor module 308 is configured to query the database of stored payloads. If request processor module 308 cannot find a match, it handles the request like an attempt to post a new content.

If a match is found, the respective payload is loaded into the memory. Further, the set of template elements or webpages used by content advertisement module 310 to initialize the current website pot queried by the botnet client is located. The webpage for displaying postings from the webserver is requested, injecting the requested payload into the generated posting display webpage by looking for specific replacement sections, e.g., "% PAYLOAD_CONTAINER %".

The generated posting display webpage containing the payload is relayed to the reverse proxy which in turn uses the respective webpage to answer the botnet client's request in step 826.

If request processor module 308 has determined that the client is trying to create a new post, it determines the website accessed by the client by matching the used domain name and path against the list of generated websites by content advertisement module 310. It will then load the location of the prepared set of template elements into the memory and request the template elements for the posting display page from the webserver. It then relays the respective posting display page to the reverse proxy which in turn uses it to answer the botnet client's request.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 9:
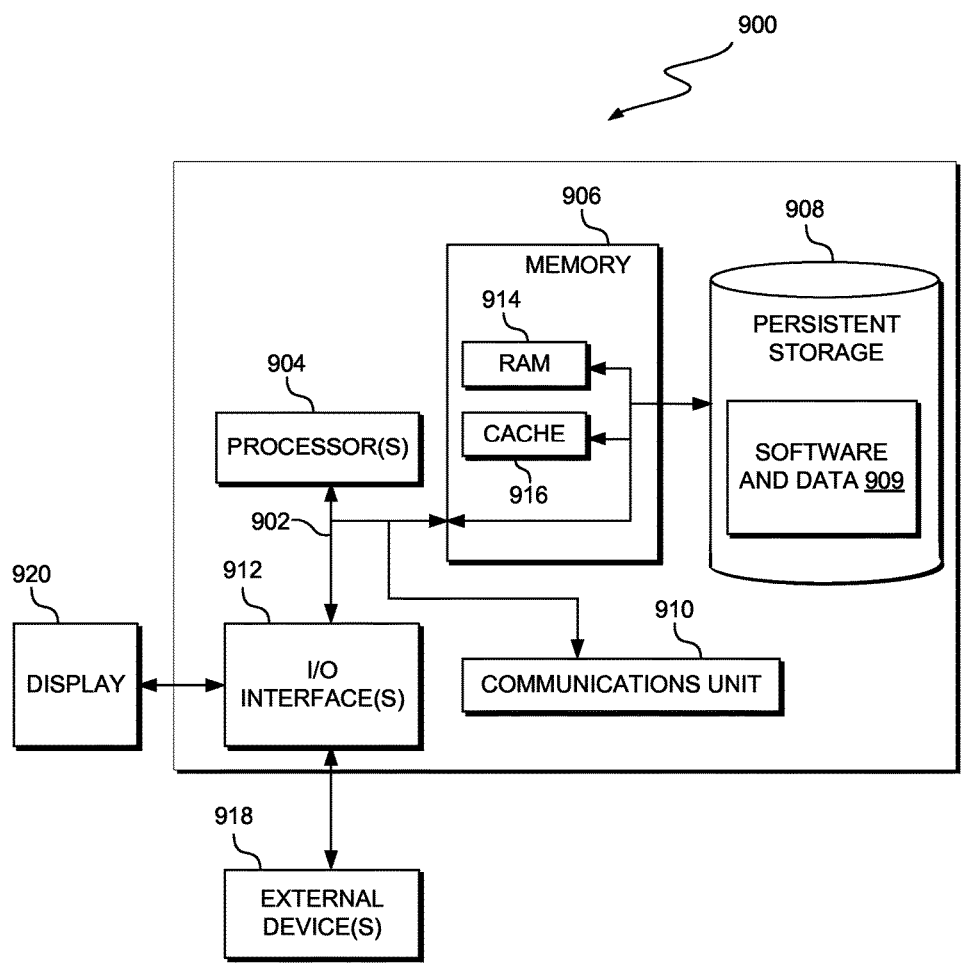
FIG. 9 depicts a block diagram of a computer system, which is representative of the computer systems of FIG. 2, in accordance with an illustrative embodiment of the present invention.

FIG. 9 depicts a block diagram of a computer system 900, which is representative of the computer systems of FIG. 2, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computer system 900 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Software and data 909 used to practice embodiments of the present invention are stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of networks, e.g., network 230, as described in the present disclosure. In these examples, communications unit 910 includes one or more network interface cards. Communications unit 910 may provide communications through the use of either or both physical and wireless communications links. Software and data 909 may be downloaded to persistent storage 908 through communications unit 910.

I/O interface(s) 912 allows for input and output of data with other devices that may be connected to computing devices such as those devices used by emulated forum server 108, anti-spam system 112, botnet client 104, and customer device 250. For example, I/O interface 912 may provide a connection to external devices 918 such as a keyboard, keypad, a touch screen, and/or some other suitable input device. External devices 918 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, network 230, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

The invention claimed is:

1. A method comprising:
   deploying, by one or more processors, a reverse proxy to a webserver;
   based, at least in part, on a list of topics, generating, by the one or more processors, one or more website templates through the reverse proxy;
   publishing, by the one or more processors, the one or more website templates to one or both of: i) search engines and ii) Internet directory sites;
   generating, by the one or more processors, a simulated website based, at least in part, on one or both of: i) the one or more website templates and ii) one or more incoming requests to the reverse proxy in response to the published website templates,
      wherein the simulated website contains an overview webpage, a posting webpage, and a posting display webpage, wherein the overview webpage within the simulated website is a virtual message board entry webpage, wherein the posting webpage within the simulated website is a virtual message board, and wherein the posting display webpage within the simulated website is used to retrieve the posting;

receiving, by the one or more processors, a request message directed to the simulated website through the reverse proxy;

analyzing, by the one or more processors, based on a plurality of request pattern data contained within a request pattern database, the request message for evidence that the request message originates from a source of spam;

in response to a determination that the request message likely does originate from a spam source, providing, by the one or more processors, data about the spam source to an anti-spam system; and blocking the request message.

2. The method of claim 1, wherein the step of analyzing, by the one or more processors, based on a plurality of request pattern data contained within a request pattern database, the request message for evidence that the request message originates from a spam source further comprises:

extracting, by the one or more processors, a source address of the request message;

determining, by the one or more processors, whether the request message requests to add a payload in a posting to a virtual message board of the website; and searching, by the one or more processors, the payload for one or more URLs.

3. The method of claim 2, further comprising:

in response to finding one or more URLs in the payload, extracting, by the one or more processors, the one or more URLs; and updating, by the one or more processors, one or more anti-spam blacklists with the source address and the one or more URLs.

4. The method of claim 2, further comprising:

in response to determining that the request message requests to add the payload in the posting, sending, by the one or more processors, a first confirmation message to the source address of the request message indicating that the payload has been added in the posting.

5. The method of claim 2, further comprising adding, by the one or more processors, the payload in the posting to a posting display webpage of the simulated website and sending the posting display webpage in a second confirmation message to the source address of the request message.

6. A computer program product comprising:

one or more computer-readable storage media and program instructions stored on at least one of the one or more computer-readable storage media, the program instructions comprising:

program instructions to deploy a reverse proxy to a webserver;

based, at least in part, on a list of topics, program instructions to generate one or more website templates through the reverse proxy;

program instructions to publish the one or more website templates to one or both of: i) search engines and ii) internet directory sites;

program instructions to generate a simulated website based, at least in part, on one or both of: i) the one or more website templates and ii) one or more incoming requests to the reverse proxy in response to the published website templates, wherein the simulated website contains an overview webpage, a posting webpage, and a posting display webpage, wherein the overview webpage within the simulated website is a virtual message board entry webpage, wherein the posting webpage within the simulated website is a virtual message board, and wherein the posting display webpage within the simulated website is used to retrieve the posting;

program instructions to receive a request message directed to the simulated website through the reverse proxy;

program instructions to analyze, based on a plurality of request pattern data contained within a request pattern database, the request message for evidence that the request message originates from a source of spam; and in response to a determination that the request message likely does originate from a spam source, providing, by the one or more processors, data about the spam source to an anti-spam system; and blocking the request message.

7. The computer program product of claim 6, wherein the program instructions to analyze, based on a plurality of request pattern data contained within a request pattern database, the request message for evidence that the request message originates from a spam source further comprises:

program instructions to extract a source address of the request message;

program instructions to determine whether the request message requests to add a payload in a posting to a virtual message board of the website; and program instructions to search the payload for one or more URLs.

8. The computer program product of claim 7, further comprising:

in response to finding one or more URLs in the payload, program instructions to extract the one or more URLs; and program instructions to update one or more anti-spam blacklists with the source address and the one or more URLs.

9. The computer program product of claim 7, further comprising:

in response to determining that the request message requests to add the payload in the posting, program instructions to send a first confirmation message to the source address of the request message indicating that the payload has been added in the posting.

10. The computer program product of claim 7, further comprising program instructions to add the payload in the posting to a posting display webpage of the simulated website and sending the posting display webpage in a second confirmation message to the source address of the request message.

11. A computer system comprising:

one or more computer processors;

one or more computer-readable storage media; and program instructions stored on at least one of the one or more computer-readable storage media for execution by at least one of the one or more computer processors, the program instructions comprising:

program instructions to deploy a reverse proxy to a webserver;

based, at least in part, on a list of topics, program instructions to generate one or more website templates through the reverse proxy;

program instructions to publish the one or more website templates to one or both of: i) search engines and ii) internet directory sites;

program instructions to generate a simulated website based, at least in part, on one or both of: i) the one or more website templates and ii) one or more incoming requests to the reverse proxy in response to the published website templates,
  wherein the simulated website contains an overview webpage, a posting webpage, and a posting display webpage,
  wherein the overview webpage within the simulated website is a virtual message board entry webpage,
  wherein the posting webpage within the simulated website is a virtual message board, and
  wherein the posting display webpage within the simulated website is used to retrieve the posting;

program instructions to receive a request message directed to the simulated website through the reverse proxy;

program instructions to analyze, based on a plurality of request pattern data contained within a request pattern database, the request message for evidence that the request message originates from a source of spam; and in response to a determination that the request message likely does originate from a spam source, providing, by the one or more processors, data about the spam source to an anti-spam system; and blocking the request message.

12. The computer system of claim 11, wherein the program instructions to analyze, based on a plurality of request pattern data contained within a request pattern database, the request message for evidence that the request message originates from a spam source further comprises:
   program instructions to extract a source address of the request message;
   program instructions to determine whether the request message requests to add a payload in a posting to a virtual message board of the website; and
   program instructions to search the payload for one or more URLs.

13. The computer system of claim 12, further comprising:
   in response to finding one or more URLs in the payload, program instructions to extract the one or more URLs; and
   program instructions to update one or more anti-spam blacklists with the source address and the one or more URLs.

14. The computer system of claim 12, further comprising:
   in response to determining that the request message requests to add the payload in the posting, program instructions to send a first confirmation message to the source address of the request message indicating that the payload has been added in the posting.

15. The computer system of claim 12, further comprising program instructions to add the payload in the posting to a posting display webpage of the simulated website and sending the posting display webpage in a second confirmation message to the source address of the request message.

* * * * *